Patented Oct. 25, 1927.

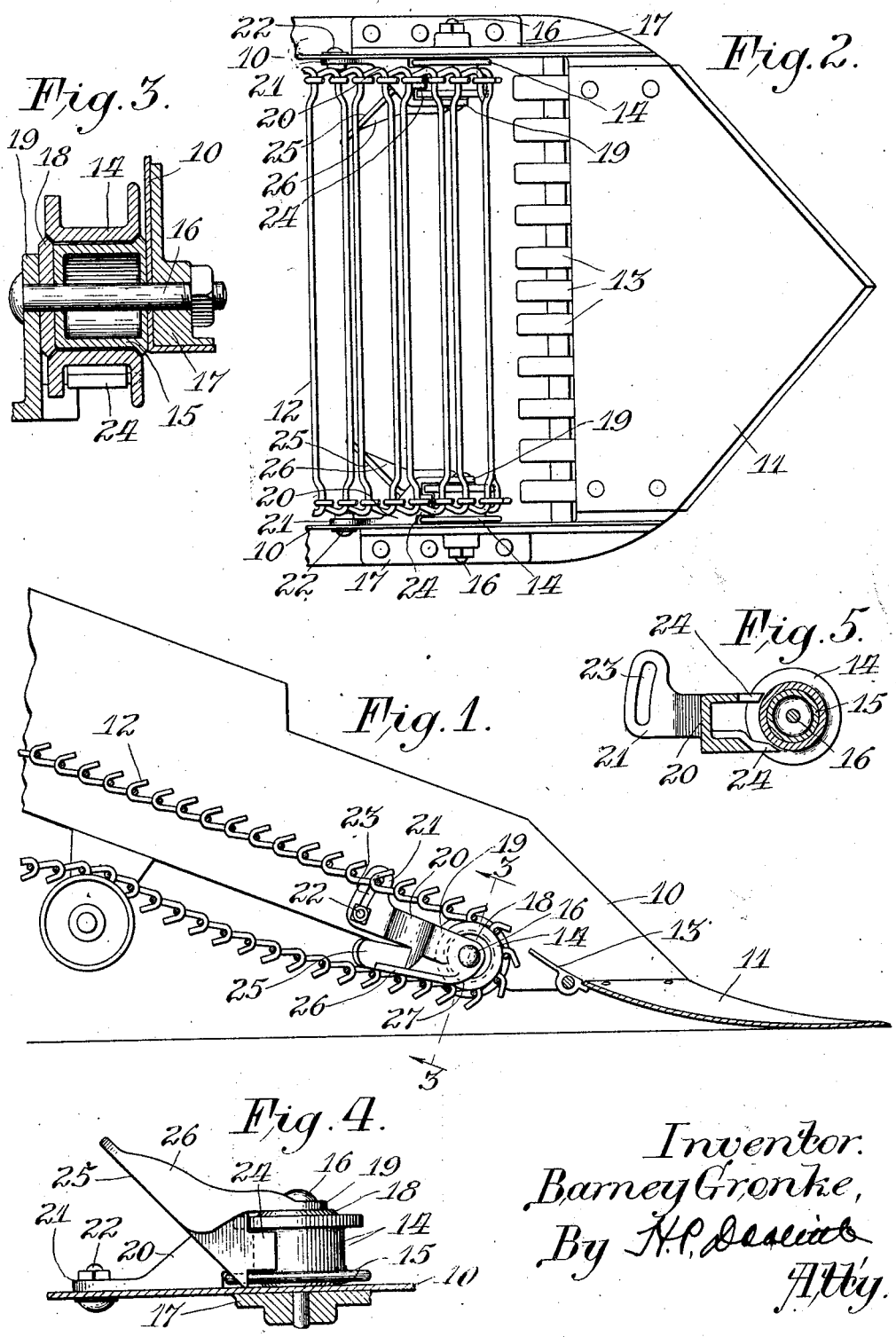

1,646,452

UNITED STATES PATENT OFFICE.

BARNEY GRONKE, OF CHICAGO, ILLINOIS, ASSIGNOR TO INTERNATIONAL HARVESTER COMPANY, A CORPORATION OF NEW JERSEY.

STONE SHIELD FOR CONVEYER SUPPORTS.

Application filed November 26, 1924. Serial No. 752,291.

The present invention relates to diggers of the endless elevator type and more particularly to such machines as potato diggers having a shovel for digging up the soil containing the crop which is then carried up by a conveyer or elevator constructed to separate the potatoes or similar crop from the soil.

In machines of the type stated the lower end of the conveyer travels over rollers or pulleys located adjacent the upper edge of the shovel, and the main object of the invention is to prevent objects such as stones, which frequently lodge on the conveyor and are carried down by the lower run thereof, from wedging in between the conveyer and the pulleys or between them and the frame of the machine thereby causing interference with proper operation and possible breakage of parts.

Another object is to provide shielding means for the supporting pulleys of the conveyer capable of adjustment in such a manner as to cooperate most efficiently with the conveyer.

With these main and other minor objects in view, the invention resides in the improved construction and arrangement of parts, or the mechanical equivalents thereof, hereinafter more fully described and defined in the claims.

Referring to the drawings,—

Fig. 1 is a longitudinal sectional view through the forward end of a potato digger including the shielding means comprising the invention;

Fig. 2 is a similar plan view;

Fig. 3 is a detail sectional view on the lines 3—3, Fig. 1;

Fig. 4 is a detail view of one of the rollers and shields viewed from beneath; and Fig. 5 is a vertical sectional view through one of the rollers and shields.

In the present disclosure of the invention there is illustrated a potato digger of standard construction comprising upwardly inclined side plates 10 between the lower ends of which there is secured the digging shovel 11. A rod link conveyer 12 of a well known type is mounted between the side plates and the space between the lower end of the conveyer and the upper edge of the shovel is occupied by the usual trap fingers 13.

The structure more particularly comprising the invention includes the groove rollers 14 supporting the lower end of the conveyer and mounted on the side plates 10 adjacent the upper edge of the shovel, as best seen in Fig. 1. The interlocked ends of the rods composing the elevator engage the grooves of the rollers as the conveyer travels thereover. As the construction and arrangement of both of the roller mountings and shields are identical, only one of them will be described in detail.

As best illustrated in Fig. 3, the roller 14 is journaled on a hollow bushing 15 fixed in position against the inner face of side plate 10 by a bolt 16 which passes through the side plate and through a reinforcing piece 17 on the outer side thereof. This bolt has its inner end passing through a retaining washer 18 and through a vertical plate portion 19 on the shield to be described. The washer 18 projects slightly beyond the body of the bushing and together with a similar raised edge on the inner end of said bushing produces a concave surface on which the roller 14 is retained.

The vertical shielding plate 19 of the shield extends over the inner face of the roller and rearwardly to a point just behind it where it merges into an obliquely extending shielding plate 20 extending toward the side wall or plate 10 where it again merges into the attaching plate 21 which is in contact with said wall. The plate 21 is supported on the side wall 10 by means of a bolt 22 carried by the side wall and engaged in an arcuate slot 23 in the plate, the arc of said slot being centered on the axis of the roller about bolt 16. The triangular space between plate 20 and the rear of the roller 14 is closed by upper and lower horizontal plates 24 which are formed to occupy the groove in the roller and prevent entry of foreign matter behind the same.

Extending from the lower edge of plate 19 and a portion of plate 20 and preferably integral therewith is a deflecting wing 25. This deflecting wing extends substantially at right angles to the plate 20 of the shield from a point adjacent the edge of the lower run of the conveyer 12 obliquely inwardly and upwardly with relation thereto. The deflecting wings on opposite sides of the conveyer may, therefore, be said to converge upwardly with relation to the conveyer. The forwardly facing angular space between the deflecting wing 25 and the plate 19 is preferably closed by a horizontal web 26, the forward end of which curves upwardly, as at 27, thereby serving as a shoe or runner normally in contact with the lower run of conveyer 12.

It will be evident from the above description that the deflecting wing 25 may be adjusted to proper position in light contact with the lower run of the conveyer by loosening bolt 22 and moving the shield on bolt 16 as an axis and that when in proper position the two deflecting wings will serve to deflect or direct matter carried down on the outer portions of the lower run of the conveyer outwardly over its edges thus preventing it from becoming wedged between the roller and conveyer with injurious results. The shielding means also serve as supports for the inner ends of the bolts 16 and as effective means for preventing lodgment of foreign matter in the grooves of the rollers. The construction above described exemplifies but one form of the invention as now preferred, but it will be obvious to those skilled in the art that certain modifications may be made without departure from the gist of the invention as defined in the following claims.

What is claimed is:

1. The combination with a digger comprising side walls and an endless conveyer having its lower end passing over rollers journaled on supports on the inner faces of said walls; of shields adjustably secured to the side walls between the runs of the conveyer and behind the rollers and provided with shielding plates pivotally mounted on the roller supports adjacent the inner faces of the rollers for adjustment about the axes of the rollers, and a deflecting wing projecting from the lower portions of each shield in proximity to the lower run of the conveyer and extending inwardly from a position adjacent its edge.

2. The combination with a digger comprising side walls and an endless conveyer having its lower end passing over rollers journaled on supports on the inner faces of said walls; of shields secured to the side walls between the runs of the conveyer and behind the rollers and provided with shielding plates extending over the inner faces of the rollers and with a deflecting wing extending from a point adjacent the edge of the conveyer.

3. The combination with a digger comprising side walls and an endless conveyer having its lower end passing over rollers journaled on supports on the inner faces of said walls; of shielding means mounted between the runs of the conveyer and protecting the rear portions of the rollers, said shields including means for directing material carried down by the lower run of the conveyer outwardly over its edges.

4. The combination with a digger comprising side walls and an endless conveyer having its lower end passing over rollers journaled on supports on the inner faces of said walls; of shielding means mounted between the runs of the conveyer and protecting the rear portions of the rollers, said shields comprising deflecting wings extending inwardly from the edges of the conveyer, and means for adjusting said wings towards and from the lower run of the conveyer.

5. The combination with a digger comprising an endless conveyer and supports therefor, of means extending between the upper and lower runs of the conveyer and cooperating with the lower run to engage obstacles being carried down thereon and direct them outwardly over its edges.

6. A shield for the conveyer supporting rollers of root crop harvesters, comprising an attaching portion, plates extending therefrom and formed to embrace the rear portion of a conveyer supporting roller, and a deflecting wing below said plates and adapted to cooperate with the surface of a conveyer.

In testimony whereof I affix my signature.

BARNEY GRONKE.